Patented July 17, 1951

2,560,632

UNITED STATES PATENT OFFICE 2,560,632

STABILIZING CRACKED DISTILLATE

Paul H. Carnell, Albion, Mich., assignor to
Leonard Refineries, Inc., Alma, Mich.

No Drawing. Application September 30, 1949,
Serial No. 119,011

13 Claims. (Cl. 44—77)

This invention relates to a process for stabilizing cracked distillates, and more particularly to the prevention of color and sludge formation in catalytically cracked oils of the furnace distillate and Diesel fuel type.

The art of catalytic cracking has developed rapidly during recent years and with it problems have arisen not all of which can be solved by methods used in connection with corresponding thermally cracked products.

The type of catalytic cracking referred to herein is that in which hydrocarbon oils are contacted, generally in the vapor phase, with catalysts such as synthetic silica-alumina, silica-alumina-zirconia, silica-alumina-magnesia, etc., and acid treated clays generally of the bentonite or montmorillonite type.

Among the products of catalytic cracking are relatively high boiling distillates which have value, especially as furnace oils and Diesel fuels. These boil in the range of about 380° F. to 640° F. although higher end points are sometimes used, for example 720° F.

In storage these catalytically cracked furnace distillates tend to become darker in color and in many instances a sludge separates after the oil has stood for several days or weeks. The development of sludge is, of course, a serious problem since it may result in an accumulation of insoluble material which tends to clog burner tips and results in imperfect operation of the furnace. The development of color is objectionable largely from the standpoint of marketability. The general public has come to regard a light colored oil as desirable and objects to changes in color in the oil upon storage. The formation of color is not always associated with sludge formation but in many instances the two go hand in hand.

The usual methods for protecting straight run or cracked hydrocarbon distillates from color and sludge formation have not been found applicable to the catalytically cracked furnace distillates. Thus, the color and gum antioxidants widely used in thermal and catalytically cracked gasoline have little or no benefit in catalytically cracked furnace distillates. Treatment of furnace oil with sulphuric acid or by solvent extraction, etc., is impractical and uneconomical due to the fact that it is accompanied by relatively high losses of the distillate. Such treatment not only removes objectionable components, but certain desirable components as well. The increased processing cost and decreased yield preclude such treatment from the standpoint of economics.

I have discovered that furnace distillates of the character described can be inhibited or stabilized against color and gum formation by adding thereto minute proportions of formaldehyde.

The formaldehyde can be added in several ways. According to one preferred embodiment an aqueous solution of formaldehyde, for example, of about 37–40% concentration, may be dispersed in the furnace distillate. Commercially available solutions comprise water and in most instances an alcohol such as methyl alcohol. The proportion of formaldehyde solution of 37–40% concentration may range from about 0.003% to about 1%, but preferably is from about 0.005% to about 0.25% by weight.

The upper limit of proportions of formaldehyde used is governed largely by the distillate stability desired. The odor of the distillate is improved by the formaldehyde. This has been proved by submitting samples of treated and untreated distillate to numerous persons and allowing them to select the samples which they considered to have the best odor. In more than 90% of the cases, samples treated with formaldehyde have been selected as having an improved odor, particularly after an "aging," or reaction period, of several days. Consequently the exact proportion chosen will depend (1) upon that necessary to stabilize the distillate and (2) upon the odor effect.

An emulsifying agent such as an amine or ammonia soap of cerotic acid may be employed to assist in dispersing the solution.

When such a solution is used it is apparent from my work that the methyl alcohol is not the inhibiting agent. Methyl alcohol alone has a deleterious effect on the color of the distillate after it has been stored for several days. The presence of a measured amount of methyl alcohol in the formaldehyde solution may be desirable during treating operations in cold weather. Under these conditions, the methanol has value as an antifreeze agent and as a solutizer to promote solution of formaldehyde in the distillate.

Another method of treating the distillate is to contact it with a relatively large volume, for example, 5 to 100 volume per cent of 38–40% Formalin, and then separate the aqueous phase from the distillate.

Without being bound to a theory, it appears that the formaldehyde becomes dissolved in the oil. When the oil is agitated with a relatively large proportion of aqueous solution, enough of the solution should be used and it should have a concentration such that the desired proportion of formaldehyde will dissolve in the oil.

Another method for adding formaldehyde to the oil is to dissolve small proportions of the order of 0.01 to 0.2% by weight of solid formaldehyde polymer in the oil. This may be done at a temperature ranging from normal atmospheric to about 300° F. The formaldehyde appears to depolymerize from the polymer and become dissolved in the oil. Here again the exact proportion of polymerized formaldehyde used will depend upon the stabilization desired, the temperature of treatment, and the odor of the final product. It is generally in the range of 0.001 to about 0.02% and preferably about 0.005 to about 0.1%.

Another method of treating the oil is to dissolve formaldehyde gas in it. For example, the formaldehyde gas can be generated by depolymerization of polymerized formaldehyde at a slightly elevated temperature, for example, 150–300° F. This can also be done at room temperature although the vapor pressure of formaldehyde polymer is comparatively low, and hence gas evolution is somewhat slower. Formaldehyde gas can be generated from its aqueous or other solutions, for example, by warming them and passing an inert sweep gas therethrough, which in turn is passed into the distillate. The distillate dissolves the formaldehyde from the sweep gas, the latter being vented. Other known methods of generating the formaldehyde may be used. The proportions of gas used are in the above described ranges. Thus, it may be seen that the presence of water in the distillate is not essential.

As will be seen from the examples, other aldehydes are not the equivalent of formaldehyde. Thus, benzaldehyde, furfural and acetaldehyde have the effect of increasing the rate of color formation which is exactly contrary to the effect of formaldehyde.

The effect produced by formaldehyde appears to be largely a true inhibitor effect and not due to the extraction of unstable constituents from the oil. That this is true is shown by the fact that oil, that has been stabilized to a satisfactory extent by addition of formaldehyde, is rendered less stable if the formaldehyde is extracted, for example, by a water wash and also by the fact that formaldehyde gas, itself, stabilizes the oil.

If the oil, after addition of or contact with aqueous solutions of formaldehyde, is cloudy, the excess water can be removed by filtration since the oil contains enough dissolved formaldehyde to stabilize it. From this it can be seen that the effect is not one of extraction.

Why formaldehyde is effective is not known. The color instability of cracked furnace distillates appears to be enhanced by the presence of oxygen. Formaldehyde is not considered an antioxidant, at least, in the sense that term is used in the petroleum oxidation-inhibitor art. The usual commercial antioxidants used as inhibitors for cracked gasoline, etc., have not been effective in catalytically cracked furnace oils. Formaldehyde stabilizes the oil against color and sludge formation in sunlight and in ultraviolet light, as well as in the dark.

A further beneficial effect of the formaldehyde treating of furnace oils has been observed, namely, in the deactivation of metals, particularly copper and iron, with which the oil may come in contact. If the oil is stored in the dark, or exposed to light in contact with copper, brass or other copper-containing metals, color deterioration and gum formation are accentuated. The presence of formaldehyde deactivates these metals and protects the oil from degradation. This is important since valves, lines and fittings which the oils contact often comprise copper or other metals which accelerate deterioration.

The invention is not limited to the use of 37–40% formaldehyde solutions but such concentrations are commercially available and require smaller proportions of treating agent, hence, are preferred. Generally concentrations of 5–40% formaldehyde are used. Excellent results have been obtained with 10–20% formaldehyde solutions.

The following examples are given to illustrate the beneficial effects of this invention:

*Example 1.*—A fresh, raw cracked distillate boiling in the range of 380° F. to 640° F. was treated as indicated in Table I. Ten parts of the oil was washed with one part of formaldehyde solution, the layers were separated and the oil layer was filtered through filter paper and stored in gallon tin cans. According to A. S. T. M. Method D–155–45–T, the color was determined initially and after 17 and 28 days of dark storage. The copper resin gum was determined after 14 days according to the method of Rescorla and Drew, Oil and Gas Journal, July 1948, page 238. This is recognized as an accelerated stability test. It will be noted that the distillate was stabilized by formaldehyde but the ability of the formaldehyde to stabilize the oil was reduced when the stabilized oil was washed with water.

TABLE I

| Expt. No. | Sample Treatment | Color | | | Cu-Resin Gum; 14 Days |
|---|---|---|---|---|---|
| | | Original | 17 Days | 28 Days | |
| 1 | Untreated | 2 | 5 | 7 | 24 Mgs./100 cc. |
| 2 | 38–40% Concentration of Formalin solution. | 2 | 2– | 2 | 10.9 Mgs./cc. |
| 3 | 38–40% Formalin plus 3 times water. | 2 | 2½ | 3+ | |

*Example 2.*—A similar oil was shaken with various volume proportions of aqueous formaldehyde solution. An accelerated stability test was made in which the oil was held at 212° F. for 24 hours and the color determined. A similar sample after 13 days of storage in the dark was exposed to sunlight for 3 days and the color determined. It will be noted that the treatment by 10% or more by volume improved the stability of the oil both in the accelerated test and in the sunlight. In the case of this particular oil it would appear that insufficient formaldehyde dissolved in the oil when the lower percentages of solution were used. Results are shown in Table II.

TABLE II

| Expt. No. | Vol. per cent of 38–40% HCHO | Original Color | Color after 24 Hrs., 212° F. | Color after 3 days in sun [2] |
|---|---|---|---|---|
| 1 | (¹) | 2– | 4½ | 3+ |
| 2 | 2 | 2– | 4½– | 3½ |
| 3 | 5 | 2– | 4 | 3+ |
| 4 | 10 | 2– | 3½– | 2½+ |
| 5 | 20 | 2– | 3 | 2½ |
| 6 | 30 | 2– | 3 | 2½ |
| 7 | 40 | 2– | 3 | 2½ |
| 8 | 50 | 2– | 2½ | 2½ |
| 9 | 60 | 2– | 2½+ | 2½ |
| 10 | 70 | 2– | 2½+ | 2½ |
| 11 | 80 | 2– | 2½– | 2½ |
| 12 | 90 | 2– | 2½– | 2½ |
| 13 | 100 | 2– | 2½– | 2½ |

[1] No treatment.
[2] After 13 days dark storage in cans.

*Example 3.*—A raw, fresh catalytically cracked furnace distillate from a Michigan crude source was stored in the dark for 47 days with and without treatment with formaldehyde solution. The oil was shaken with the solution before it was stored. After 47 days the color of the untreated sample had deteriorated markedly and there was a heavy sludge formed, as is shown in Table III. In the samples treated with formaldehyde only a small increase in color occurred and sludge formation was prevented. The table also contains comparative tests on a second oil which was slightly less unstable than the first. The beneficial effects of formaldehyde treatment are apparent.

TABLE III

| Expt. No.[1] | Sample Treatment | NPA Color | | Amount of Sludge |
|---|---|---|---|---|
| | | Original | After 47 days | |
| 1 | Raw distillate | 2½ | 7 | Heavy. |
| 2 | 5 cc. 38–40% HCHO shaken with 50 cc. oil in 8 oz. bottle. | 2½ | 3½+ | None. |
| 3 | Raw distillate | 2 | 4½ | Heavy. |
| 4 | Shaken 40% HCHO | 2 | 2½ | None. |

[1] These samples were stored in glass in the dark for 47 days.

*Example 4.*—The results obtained from this experiment are shown in Table IV. The designated proportions of aqueous formaldehyde solution was dispersed in the distillate and the color determined after 19 and 31 days. The data show decided color stability when the formaldehyde is added in concentrations of about 0.003% by volume.

TABLE IV

| Expt. No. | Vol. per cent 38–40% HCHO Added | NPA Color | | |
|---|---|---|---|---|
| | | Original | After 19 days | After 31 days |
| 1 | ([1]) | 2½ | 3½ | 4+ |
| 2 | 0.003 | 2½ | 2½– | 4 |
| 3 | 0.006 | 2½ | 3+ | 3½+ |
| 4 | 0.009 | 2½ | 3+ | 3½+ |
| 5 | 0.011 | 2½ | 3+ | 3½+ |
| 6 | 0.014 | 2½ | 3+ | 3½+ |
| 7 | 0.028 | 2½ | 3+ | 3½ |
| 8 | 0.057 | 2½ | 3 | 3½– |
| 9 | 0.11 | 2½ | 3– | 3+ |
| 10 | 0.23 | 2½ | 3– | 3– |
| 11 | 0.46 | 2½ | 2½+ | 3– |
| 12 | 0.91 | 2½ | 2½+ | 3– |

[1] Raw sample.

*Example 5.*—Solid formaldehyde polymer in the proportions indicated in Table V were added to a catalytically cracked furnace distillate which was at a temperature of 150° F. It will be noted that in concentrations above 0.8 gram of polymer per gallon of oil, improvement in stability occurred. The results indicate that, for this particular oil, no more than 2.4 grams per gallon of oil are required to satisfactorily stabilize the oil in dark storage.

TABLE V

*Addition of Paraform (solid formaldehyde polymer) to distillate at 150° F.*

| Expt. No. | Grams of Paraform[1] Added/gal. of oil | NPA Color | |
|---|---|---|---|
| | | Original | After 19 days[2] |
| 1 | None | 2+ | 3½ |
| 2 | 0.2 | 2+ | 3½– |
| 3 | 0.8 | 2+ | 3– |
| 4 | 1.6 | 2+ | 3– |
| 5 | 2.4 | 2+ | 2½+ |
| 6 | 3.2 | 2+ | 2½+ |
| 7 | 4.0 | 2+ | 2½+ |

[1] Ranges from 0.007 wt. per cent to 0.14 wt. percent.
[2] Dark storage in one gallon cans.

*Example 6.*—A similar oil was treated with formaldehyde polymer at 300° F. In this case improved effects were observed with as little as 0.2 gram per gallon of oil, as is shown in Table VI.

TABLE VI

*The effect of adding Paraform (solid formaldehyde polymer) to the distillate at 300° F.*

| Expt. No. | Gr. Paraform[1] per gal. oil | NPA Color | | | |
|---|---|---|---|---|---|
| | | Original | After 13 days[2] | After 45 days[2] | After 24 hrs. 212° F. |
| 1 | None | 2 | 2½+ | 4– | 5+ |
| 2 | 0.2 | 2 | 2½+ | 3½– | 4½+ |
| 3 | 0.8 | 2 | 2+ | 3– | 4½+ |
| 4 | 1.6 | 2 | 2+ | 2½– | 3½+ |

[1] Ranges from 0.007 wt. percent to 0.056 wt. percent.
[2] Dark storage in one gallon cans.

*Example 7.*—Table VII is a tabulation of results obtained when using aldehydes other than formaldehyde. The accelerated storage test at 212° F. was used. It will be noted that only those samples to which formaldehyde had been added showed any substantial stability. Some aldehydes have a deleterious effect. Of the aldehydes tested, formaldehyde appears unique as a color and sludge stabilizer in catalytically cracked furnace oils.

TABLE VII

*The effect of various aldehydes as color inhibitors*

| Expt. No. | Distillate Treatment | Color | |
|---|---|---|---|
| | | Original | 24 hrs. at 212° F. |
| 1 | None | 2½ | 7. |
| 2 | 1% benzaldehyde | 2½ | Black. |
| 3 | 1% furfural | 2½ | More than 8. |
| 4 | 40% Formalin wash | 2½ | 4+. |
| 5 | do | 2½ | 4–. |
| 6 | 0.1% acetaldehyde | 2½ | 7–. |
| 7 | 0.5% acetaldehyde | 2½ | 7–. |
| 8 | None | 2½– | 7. |
| 9 | 40% Formalin wash | 2½– | 4–. |
| 10 | 0.01% benzaldehyde | 2½– | 7–. |
| 11 | 0.05% benzaldehyde | 2½– | 7+. |

*Example 8.*—In Table VIII are shown results obtained when a furnace distillate was exposed to sunlight in the presence and absence of metallic copper. It will be noted that the presence of copper greatly increases the rate of color deterioration on the raw oil. However, the raw oil treated with formaldehyde was stable in the presence of copper. The formaldehyde deactivates the copper.

TABLE VIII

*The effect of formaldehyde as a metal deactivator*

| Expt. No. | Distillate Treatment | NPA Color | |
|---|---|---|---|
| | | Original | After 20 hrs. sun |
| 1 | Untreated—raw | 1½+ | 2½+ |
| 2 | Raw oil plus copper strip | 1½+ | 8+ |
| 3 | Raw oil contacted 10 min. with copper | 1½+ | 5– |
| 4 | Raw oil 10 min. contact with copper then Formalin washed. | 1½+ | 2 |
| 5 | Raw oil Formalin washed | 1½+ | 2 |
| 6 | Raw oil Formalin washed then copper contacted | 1½+ | 2½– |
| 7 | Raw oil Formalin washed then copper strip added. | 1½+ | 3½+ |

*Example 9.*—A raw catalytically cracked furnace distillate was treated with several commercial gasoline gum inhibitors and metal deactivators, widely used in cracked gasoline, using proportions of inhibitor known to be effective in gasoline. The samples were stored in glass bottles in sunlight for four days. The samples treated with formaldehyde were shaken with a 37% aqueous solution before testing. The results, tabulated in Table IX, show that only the formaldehyde treated samples were stabilized.

TABLE IX

*Comparison of the color stabilizing effect of various inhibitors on cracked distillate*

| Expt. No. | Inhibitor added to the Distillate [1] | ASTM Color Original | ASTM Color After 4 days |
|---|---|---|---|
| 1 | Raw Distillate | 1½+ | 4 |
| 2 | Paranox 105 | 1½+ | 4 |
| 3 | Paranox 62 | 1½+ | 4− |
| 4 | Paranox 447-A | 1½+ | 5 |
| 5 | Paranox 441 | 1½+ | 4 |
| 6 | U. O. P. No. 1 | 1½+ | 4½− |
| 7 | U. O. P. No. 4 | 1½+ | 4 |
| 8 | U. O. P. No. 5 | 1½+ | 5+ |
| 9 | U. O. P. Copper Deactivator | 1½+ | 4½ |
| 10 | DuPont Antioxidant No. 6 | 1½+ | 4+ |
| 11 | Du Pont Fuel Oil Stabilizer No. 1 | 1½+ | 4½− |
| 12 | Du Pont Metal Deactivator | 1½+ | 5 |
| 13 | Formalin 37% | 1½+ | 3+ |
| 14 | Formalin Washed 37% | 1½+ | 2½+ |

[1] The following comprises available information relative to the composition of the inhibitors:
U. O. P. No. 4: N-butylamino phenol plus a small amount of butyl phenylene diamine
U. O. P. No. 5: Di-sec-butyl-p-phenylene diamine
Du Pont Fuel Oil Stabilizer No. 1: A three component mixture containing an aminophenol antioxidant and two metal deactivators totalling 57% of the mixture; 38% isopropanol; 5% xylene
Du Pont Metal Deactivator: N:N′-disalicylidene-1:2-diaminopropane
Paranox 441: Low temperature oxidation inhibitor for turbine and hydraulic oils
Paranox 447-A: Same as 441 but contains a rust inhibitor
Paranox 105: Motor oil oxidation inhibitor and detergent, accent on inhibiting
Paranox 62: Same as 105 but accenting detergency

*Example 10.*—In Table X is shown the effect of the formaldehyde treatment of a furnace distillate on the stability of the distillate in the presence of iron and steel wool. It will be noted that the formaldehyde deactivates the metal and stabilizes the distillate.

TABLE X

*The effect of iron on the stability of cracked distillate with and without Formalin scrubbing*

| Expt. No. | Distillate Treatment | ASTM Color Original | ASTM Color 24 hrs. in sun |
|---|---|---|---|
| 1 | Raw oil | 1½+ | 2½ |
| 2 | Raw oil plus a strip of iron | 1½+ | 4 |
| 3 | Raw oil plus steel wool | 1½+ | 3½− |
| 4 | Formalin washed | 1½+ | 2− |
| 5 | Formalin washed plus iron strip | 1½+ | 2− |
| 6 | Formalin washed plus steel wool | 1½+ | 2− |

*Example 11.*—An unstable furnace distillate was treated in the manner indicated in Table XI. It will be noted that formaldehyde containing about 1 to 5% of formic acid shows a slight improvement in stabilizing effect over the use of formaldehyde alone. The concentration of formic acid in the formaldehyde is preferably less than about 1%.

TABLE XI

*The effect of formic acid in Formalin used for distillate scrubbing*

| Expt. No. | Distillate Treatment | ASTM Color Before | ASTM Color 7 days in sun |
|---|---|---|---|
| 1 | Raw oil | 2+ | 5+ |
| 2 | Formalin scrubbed | 2+ | 3½ |
| 3 | Scrubbed with Formalin shaken with calcium carbonate | 2+ | 3½ |
| 4 | 37–40% Formalin containing 1% of 85% Formic Acid | 2+ | 3½− |
| 5 | 37–40% Formalin containing 5% of 85% Formic Acid | 2+ | 3½− |
| 6 | 37–40% Formalin containing 10% of 85% Formic Acid | 2+ | 4 |
| 7 | 37–40% Formalin containing 50% of 85% Formic Acid | 2+ | 4½− |
| 8 | 85% Formic Acid only | 2+ | 4½ |

*Example 12.*—As may be seen from Table XII treatment of the distillate with dilute sulfuric acid followed by the formaldehyde treatment decreased the effectiveness of the formaldehyde. Pretreatment with formic acid followed by addition of formaldehyde was not harmful to the stabilizing effect of the formaldehyde. Pretreatment of the distillate with dilute caustic followed by addition of formaldehyde further improved the stability of the distillate.

TABLE XII

*The effect of alkali and acid scrub preceding Formalin treatment*

| Expt. No. | Distillate Treatment | ASTM Color Original | ASTM Color 9 days sunlight |
|---|---|---|---|
| 1 | 5% Sodium Hydroxide plus water plus 37–40% Formalin | 1½+ | 3+ |
| 2 | 5% Sulfuric Acid plus water plus 37–40% Formalin | 1½+ | 4− |
| 3 | 85% Formic Acid plus water plus 37–40% Formalin | 1½+ | 3½+ |
| 4 | 37–40% Formalin | 1½+ | 3½+ |
| 5 | Raw Oil | 1½+ | 4½+ |

*Example 13.*—As may be seen from Table XIII the stability of the distillate containing formaldehyde is markedly improved when the distillate is blanketed with an inert gas, such as, carbon dioxide or nitrogen. This table shows that the stabilizing effect is not due entirely to the inert gas although some improvement was obtained thereby. It is within the scope of the invention to add formaldehyde and to blanket the distillate with an inert gas.

TABLE XIII

*The effect of treating a Formalin washed sample with nitrogen or carbon dioxide to remove residual oxygen*

| Expt. No. | Distillate Treatment | ASTM Color Original | ASTM Color 6 days sun | ASTM Color 39 days in light |
|---|---|---|---|---|
| 1 | Raw oil | 2½− | 4− | 4½− |
| 2 | Raw oil plus carbon dioxide blanket | 2½− | 3− | 3+ |
| 3 | Raw oil plus nitrogen blanket | 2½− | 2½+ | 3 |
| 4 | 37–40% Formalin scrub plus carbon dioxide blanket | 2½− | 2½− | 2½− |
| 5 | 37–40% Formalin scrub plus nitrogen blanket | 2½− | 2½− | 2½− |

*Example 14.*—Table XIV shows the effect on improvement of color stability based upon dark storage of furnace distillate treated in the refinery with 10 to 18% formaldehyde solution. The samples were stored from 16 to 28 days and showed substantial color stability improvement.

TABLE XIV

*The effect of aging on the color of distillate scrubbed in the refinery with 10 to 18% Formalin solution*

| Expt. No. | Sample Age, Days | ASTM Color | | | |
|---|---|---|---|---|---|
| | | Raw Distillate | | 10-18% Formalin Washed | |
| | | Original | Aged | Original | Aged |
| 1 | 28 | 2− | 4− | 2− | 1½+ |
| 2 | 27 | 2− | 2½ | 2− | 2− |
| 3 | 25 | 2− | 4½+ | 2− | 2− |
| 4 | 17 | 2− | 3½+ | 2− | 2+ |
| 5 | 16 | 2½+ | 2− | 1½+ | 1½+ |

The proportion of formaldehyde in the oil was about 0.005%. The method of treatment used was to mix the formaldehyde solution with the furnace distillate in a venturi and pass the mixture through a tower containing baffles. The mixture was then passed to a separator and the aqueous layer permitted to separate out. The aqueous layer was then recirculated. It was fortified from time to time by adding additional 37–40% formaldehyde solution to keep the concentration within the indicated range. Another method of fortifying the solution is to add the appropriate quantities of formaldehyde polymer, maintaining a temperature in the treating system such that it is depolymerized.

I claim:

1. A process for stabilizing catalytically cracked furnace distillate against color and sludge formation which comprises dissolving formaldehyde therein.

2. The process of claim 1 wherein the treatment is carried out at about 50° to 300° F.

3. The process of claim 1 wherein the concentration of formaldehyde is about 0.003% to about 1% by weight dissolved and dispersed in the oil.

4. The process of claim 1 wherein the formaldehyde is added as an aqueous solution.

5. The process of claim 1 wherein the formaldehyde is added as a solution in water and an alcohol.

6. The process of claim 1 wherein the formaldehyde is added as a solution in water and methyl alcohol.

7. The process of claim 1 wherein the formaldehyde is added as solid formaldehyde polymer.

8. The process of claim 1 wherein the formaldehyde is added as a gas.

9. The process of claim 1 wherein the distillate is shaken with an aqueous solution of formaldehyde and then the aqueous phase separated.

10. The process of claim 1 wherein the concentration of formaldehyde is about 0.005 to about 0.25% dissolved and dispersed in the oil.

11. A catalytically cracked furnace distillate containing a small proportion of formaldehyde sufficient to stabilize it against color and sludge formation when stored.

12. The composition of claim 11 containing 0.001 to 0.2% formaldehyde.

13. The composition of claim 11 containing 0.001 to 0.2% paraformaldehyde.

PAUL H. CARNELL.

REFERENCES CITED

The following references are of record in the file of this patent:

UNITED STATES PATENTS

| Number | Name | Date |
|---|---|---|
| 2,496,444 | Cook | Feb. 7, 1950 |

Disclaimer

2,560,632.—*Paul H. Carnell*, Albion, Mich. STABILIZING CRACKED DISTILLATE. Patent dated July 17, 1951. Disclaimer filed Oct. 17, 1951, by the assignee, *Leonard Refineries, Inc.*

Hereby enters this disclaimer to claims 1 to 10, inclusive, of said patent, to all processes embraced by said claims, except those in which formaldehyde remains dissolved or dispersed in the finished distillate, and thus remains available to exert its inhibiting and stabilizing effect during normal storage of said distillate.

[*Official Gazette December 18, 1951.*]